Patented May 4, 1954

2,677,622

UNITED STATES PATENT OFFICE 2,677,622

METHOD OF COATING FABRIC AND PRODUCT RESULTING THEREFROM

Ferdinand Leonard Schouteden, Wilrijk-Antwerp, Belgium, assignor to Gevaert Photo-Producten N. V. Mortsel-Antwerp, Belgium, a company of Belgium No Drawing. Application November 1, 1950, Serial No. 193,530

Claims priority, application Netherlands November 11, 1949

3 Claims. (Cl. 117—9)

The invention relates to a method for applying to flexible sheet materials a coating composition, and more particularly to the coating of flexible bases, such as fabric bases, with a powdery polyvinyl chloride composition.

In the manufacture of leather cloth from polyvinyl chloride, the latter is generally mixed at room temperature with the plasticizers, fillers and pigments, so as to obtain homogeneous compositions in the form of a plastisol or a powder.

According to known processes in the manufacture of leather cloth, this composition, after a certain ripening period, is laminated under heat and pressure in roll calenders to a foil which is sealed together by simultaneous lamination with a flexible base.

It is further known in the manufacture of leather cloth to spread the polyvinyl chloride mixture in the form of a paste of smooth to heavy consistency upon the base. By subsequent heat-treatment, both the mixture and the base are firmly sealed together and the plasticized mass is fused to a strongly united coating.

Though the latter method eliminates the use of expensive three- or four-roll calenders, yet this method necessitates the use of pastes of a well regulated and stabilized consistency. To attain a smooth consistency, more plasticizer can be added, although with the risk that the surface of the leather cloth may become tacky. When diluents are added to obtain the convenient plasticity, it is necessary to evaporate them, to draw off the vapors and, if desired, to recover them, which moreover are all hazardous operations.

The main object of the present invention is to prepare a polyvinyl chloride composition in an easily spread form, containing besides the polyvinyl chloride, a plasticizer and optionally fillers and pigments.

Another object of my invention is to further simplify the apparatus in the continuous manufacture of leather cloth.

Still another object of my invention is to compound plasticized polyvinyl chloride for the manufacture of leather cloth without using diluents.

Other objects and advantages of my invention will appear from the following description, examples and claims.

According to my invention, the above objects can be accomplished by a process including the preparation of a powdery polyvinyl chloride composition by mixing at room temperature polyvinyl chloride with a plasticizer, and optionally with fillers and pigments, to obtain a paste of smooth to heavy consistency, and thereafter heating the paste until it is just dry. At that point, the polyvinyl chloride composition constitutes a homogeneous composition which can easily be pulverized and further can directly be coated in this form upon the fabric base and herewith united under pressure and at relatively low temperature. During the further treatment, the coated composition is further exposed to an elevated temperature so as to obtain a tough and resistant coating upon the fabric.

The paste of smooth to heavy consistency, obtained by mixing polyvinyl chloride with the plasticizer, may be heated between 40 and 120° C. At the latter temperature, only a few minutes are sufficient for drying the paste so that it can easily be ground to a finely divided powder.

Spreading out the powder upon the base likewise may be effected in different ways, for example, by means of doctor knives, casting hoppers or brushes. Also the mill wherein the moderately heated polyvinyl chloride mixture is pulverized, can be provided with a ventilation apparatus whereby the powder particles of suitable size are immediately blown onto the fabric.

The conversion into leather cloth is carried out by passing the base, covered with the powder, under heating through the roll embosser and then heating it for a while at elevated temperature.

When the powder passes through the roll embosser, it is automatically further homogenized. The heat treatment at the roll embosser is effected at about 100–140° C., whereas the final heating may be effected at 150 to 190° C. Both heat-treatments may be effected in various ways. Thus, heat can be applied by steam heating as well as by infra-red irradiation or high-frequency heat treatment.

The intensity and the time of heating, applied during the various processings, largely depend upon the method of preparation and the degree of polymerization of the vinyl chloride, upon the composition of the mixture, upon how mixing has been effected, and above all upon the relative proportion of the plasticizer and the polyvinyl chloride.

Not only the mechanical properties, but also the cohesion between the powdered polymeric mass and the base are improved by a final high-temperature treatment which is effected after the leather cloth has been given its final appearance between the roll embosser.

Hereinafter are several examples of the coating of flexible sheet materials with a polyvinyl chloride composition according to my invention. The examples further illustrate the production of the powdery polyvinyl chloride composition from various plasticized polyvinyl chlorides. They are, however, not to be considered as a limitation of the invention; for instance, leather cloth can also be manufactured in the same way, by using compositions containing other macromolecular compounds, which may be worked up to a powder with similar properties as that obtained from the solidified polyvinyl chloride mixture as described above.

Example 1

100 parts by weight of polyvinyl chloride (commercial name Gobinyle $C_1$), 50 parts by weight of Indian red (ferric oxides) and 100 parts by weight of tricresylphosphate are mixed in a mortar. On heating the thus obtained paste for about 2 hours at 50° C., it is set so that, after cooling, it may easily be ground to a fine powder. The thus obtained powder is spread upon the fabric base by an adjustable doctor knife. Just before the powder-coated base enters the roll embosser, the powder is preheated by passing the fabric base through a 1 m. length casing in which the temperature is regulated between 100 and 110° C. The engraved roll of the roll embosser, heated at about 140° C. and having a 2 m./min. peripheral speed, gives the leather cloth the surface-structure desired. Immediately thereafter, the leather cloth passes through a 3 m. length zone in which the temperature is 170° C. After cooling, by cold air, the leather cloth is wound up.

Example 2

100 parts by weight of polyvinyl chloride (commercial name Corvic 75/61) and 60 parts by weight of polyethylene glycol di-2-ethyl-hexoate (commercial name Flexol 4GO) are mixed in a ball mill. After this treatment, the contents of the ball mill are spread upon the one end of an endless metal belt. The belt passes through a tunnel maintained at 100–110° C. temperature; the speed is regulated so that the product remains in the heated zone for 5 to 10 minutes. Upon reaching the other end of the belt, the mixture is dropped into a further ball mill wherein it is ground to powder within 10 minutes. A rotating brush distributes the powder over the surface of the fabric base. Before the fabric enters the roll embosser, it passes over a preheating roll of the same size and at the same temperature as the engraved roll mounted in close proximity thereto. After engraving, the leather cloth passes successively through a battery of infra-red lamps and over a cooled roll, and finally is wound up.

Example 3

100 parts by weight of polyvinylchloride (commercial name Geon 100 x 210, of Goodrich Chemical Co.), 100 parts by weight of di-2-ethyl-hexylphthalate (commercial name Flexol D. O. P. of Carbide & Carbon), 90 parts by weight of barite, 10 parts by weight of cadmium red and 1 part by weight of basic lead carbonate are first roughly mixed and then homogenized on a kneading roll. After heating for 45 minutes at 90° C., the mixture is pulverized, spread upon a fine fabric base in the form of a thin layer and further treated as in Example 1, however at a different speed: 4 m./min.

Example 4

100 parts by weight of polyvinyl chloride (commercial name: Afcovyl C8 of Pechiney), 70 parts by weight of dibutyl phthalate (commercial name Palatinol C), 100 parts by weight of titanic oxide and 2 parts by weight of basic lead carbonate are intensively mixed and then heated for 20 minutes at 100° C. The mixture, which is converted by this treatment from a paste of heavy consistency into brittle pieces, is ground to powder, spread upon paper and further treated as in Example 1.

Example 5

100 parts by weight of copolymer of vinyl chloride and vinyl acetate in a proportion of 95:5 (commercial name Vinylite VYNW of Carbide & Carbon), 100 parts by weight of alkylarylphosphate (commercial name Santicizer 141, of Monsanto), and 75 parts by weight of chrome green are mixed in a ball mill. The paste is spread to a thickness of 1 to 2 mm. upon a chrome plated plate and heated for 10 minutes at 98° C. After cooling, the layer is cracked. After powdering, the polyvinyl chloride composition can be worked up to leather cloth as in any one of the preceding examples.

Example 6

100 parts by weight of polyvinyl chloride (commercial name Corvic 75/62), 100 parts by weight of indian red (ferric oxides) and 100 parts by weight of polyethylene glycol of di-2-ethyl-hexoate (commercial name Flexol 4GO) are first mixed in a Banbury mixer, and then homogenized on a kneading roll. The paste is scraped off from the roll and spread upon a metal belt which carries the mass for about 10 minutes through a tunnel heated with infra-red lamps. Next the layer is placed again in a ball mill and ground to a fine powder which is processed as in Example 1.

Example 7

100 parts by weight of copolymer of vinylchloride and vinylidene chloride (commercial name Geon 202, of Goodrich), 125 parts by weight of di-2-ethyl-hexyl phthalate (commercial name Flexol D. O. P.) and 100 parts by weight of indian red (ferric oxides) are thoroughly mixed on a kneading roll. After 30 minutes heating at 110° C., the mixture is ground to powder in a ball mill and processed as in Example 1.

Example 8

100 parts by weight of polyvinyl chloride (commercial name Geon 101), 70 parts by weight of dimethylglycolphthalate (commercial name Palatinol O) and 70 parts by weight of indian red (ferric oxides), are mixed in a ball mill. The mixture is heated for 2 minutes at 130° C. and finally ground to powder in a disk mill or in a ball mill, and blown onto the fabric base by ventilation. Further processing is as in Example 1.

I claim:

1. The method of coating a fabric to provide a laminated surface film thereon, to form a product of the character of leather cloth and the like, comprising plasticizing a resin selected from the group consisting of polyvinylchloride, copolymers of vinylchloride and vinylacetate, copolymers of vinylchloride and vinylidenechloride, by mixing the said resin, the required quantity of powdered pigments and fillers and a sufficient quantity of a liquid plasticizer for said resin to form a homogeneous paste consisting of said resin, plasticizer, pigments and fillers at normal temperature, heating said paste to a temperature in the range of 40 to 120° C. for a period merely sufficient to obtain a dry, frangible, solid mixture of the plasticized resin homogeneously containing pigments and fillers, powdering said dry plasticized mixture, applying said powdered mixture to the surface of a fabric, heating said powder coated fabric under embossing rolls heated to a temperature in the range of 100 to 140° C., and finally heating the embossed coated fabric to a temperature in the range of 150 to 190° C. for a period sufficient to consolidate said coating.

2. The method as defined in claim 1, wherein the powder coated fabric prior to embossing is preheated to a temperature in the range of 100 to 110° C.

3. A leather cloth consisting of a fabric base and a coating of plasticized resin selected from the group consisting of polyvinylchloride, copolymers of vinylchloride and vinylacetate, and copolymers of vinylchloride and vinylidenechloride, fillers and pigments formed into a plasticized powder and applied by the method defined in claim 1.

References Cited in the file of this patent

UNITED STATES PATENTS

| Number | Name | Date |
|---|---|---|
| 110,727 | Beck | Jan. 3, 1871 |
| 1,065,684 | Hesse | June 24, 1913 |
| 2,241,251 | Franklin | May 6, 1941 |
| 2,355,919 | Lipsius | Aug. 15, 1944 |
| 2,371,618 | Hanson et al. | Mar. 20, 1945 |
| 2,530,852 | Bixby | Nov. 21, 1950 |